United States Patent
Huang et al.

(10) Patent No.: US 10,638,336 B2
(45) Date of Patent: Apr. 28, 2020

(54) METHOD OF ENABLING IMPROVED EFFICIENCY IN A FIRST COMMUNICATIONS NETWORK, NETWORK ENTITY, NETWORK DEVICE, COMPUTER PROGRAMS AND COMPUTER PROGRAM PRODUCTS

(71) Applicant: Telefonaktiebolaget LM Ericsson (publ), Stockholm (SE)

(72) Inventors: Vincent Huang, Sollentuna (SE); Martha Vlachou-Konchylaki, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/305,175

(22) PCT Filed: Jun. 30, 2016

(86) PCT No.: PCT/SE2016/050665
§ 371 (c)(1),
(2) Date: Nov. 28, 2018

(87) PCT Pub. No.: WO2018/004408
PCT Pub. Date: Jan. 4, 2018

(65) Prior Publication Data
US 2019/0349788 A1  Nov. 14, 2019

(51) Int. Cl.
*H04W 24/02* (2009.01)
*H04M 15/00* (2006.01)
(Continued)

(52) U.S. Cl.
CPC ........... *H04W 24/02* (2013.01); *H04M 15/50* (2013.01); *H04M 15/8038* (2013.01); *H04W 4/24* (2013.01); *H04W 8/20* (2013.01)

(58) Field of Classification Search
CPC .............................. H04W 36/08; H04L 47/14
(Continued)

(56) References Cited

U.S. PATENT DOCUMENTS

2004/0203750 A1  10/2004 Cowdrey et al.
2007/0072605 A1  3/2007 Poczo
(Continued)

FOREIGN PATENT DOCUMENTS

EP    1565028 B1    8/2007
WO    2007113383 A1    10/2007
(Continued)

OTHER PUBLICATIONS

Reiffer, G., "Identifying silent roamers to increase revenues—A Big Data use case", Jan. 27, 2015, pp. 1, retrieved on Jul. 1, 2019, retrieved from internet: https://www.vanillaplus.com/2015/01/27/5686-identifying-silent-roamers-to-increase-revenues-a-big-data-use-case/.

*Primary Examiner* — Kiet M Doan
(74) *Attorney, Agent, or Firm* — Coats + Bennett, PLLC

(57) ABSTRACT

A method (20) of enabling improved efficiency in a first communications network (10A) based on relation metrics on a relation between a first operator (A) of the first communications network (10A) and a second operator (B) of a second communications network (10A, 10B). The method (20) is performed in a network entity (7) and comprises: obtaining (21) data relating to users having a subscription with the first operator (A) and data relating to users having a subscription with the second operator (B); determining (22), based on the obtained data relating to users, a first metric IAB giving number of users roaming to the first operator (A) from the second operator (B) and a second metric OAB giving number of users roaming from the first operator (A) to the second operator (B); and providing (23) the first and second metrics IAB, OAB as relation metrics to
(Continued)

a network device (9A) of the first communications network (10A) for use in improving efficiency in the first communications network (10A). A method (50) in a network device (9A) is also provided, and a network entity, a network device, computer programs and computer program products.

18 Claims, 5 Drawing Sheets

(51) Int. Cl.
      *H04W 4/24*      (2018.01)
      *H04W 8/20*      (2009.01)

(58) Field of Classification Search
      USPC ..... 455/426.1, 435.3, 452.1, 435.1; 370/338, 370/230, 431, 332, 252
      See application file for complete search history.

(56) References Cited

U.S. PATENT DOCUMENTS

2014/0378091 A1* 12/2014 Irwin .................... H04M 15/59
      455/405
2016/0255549 A1* 9/2016 Lakhdhar .............. H04W 24/10
      370/332

FOREIGN PATENT DOCUMENTS

WO     2013002694 A1   1/2013
WO     2015183165 A1   12/2015

\* cited by examiner

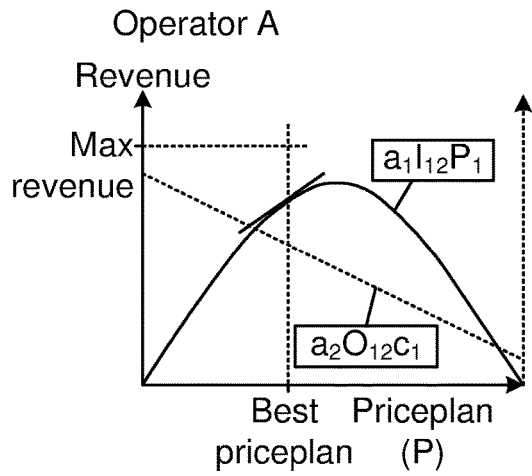 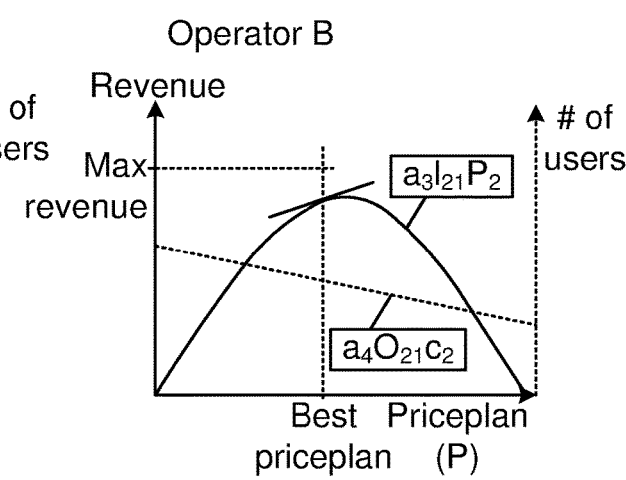
Fig. 5a　　　　　　　　　　Fig. 5b
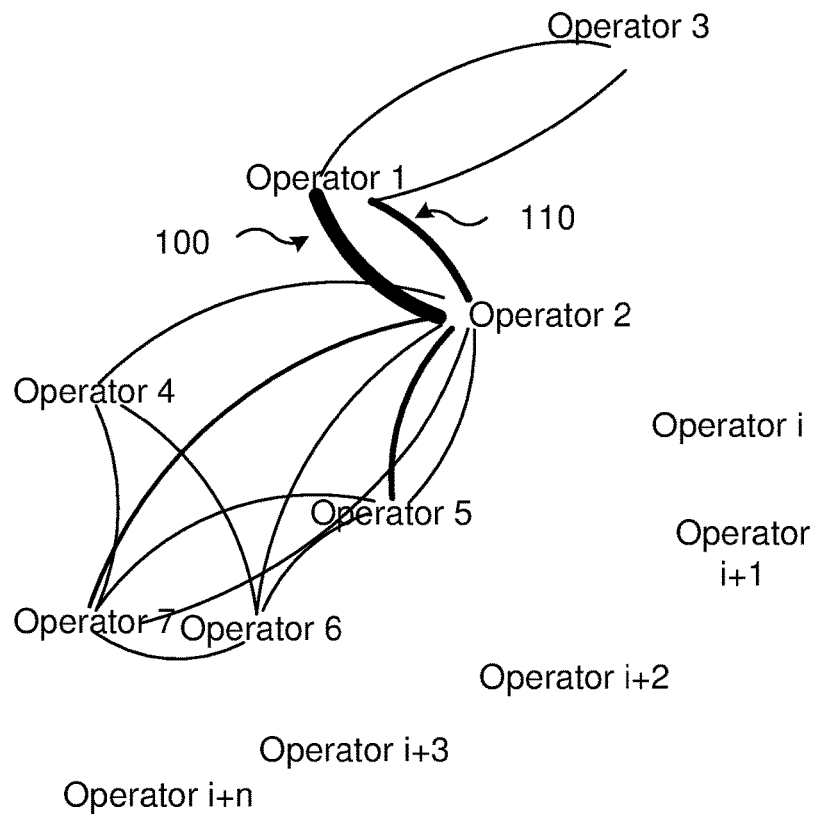
Fig. 6

METHOD OF ENABLING IMPROVED EFFICIENCY IN A FIRST COMMUNICATIONS NETWORK, NETWORK ENTITY, NETWORK DEVICE, COMPUTER PROGRAMS AND COMPUTER PROGRAM PRODUCTS

TECHNICAL FIELD

The technology disclosed herein relates generally to the field of communications networks, and in particular to methods for improving efficiency in communications networks, to a network entity, network device, computer programs and computer program products.

BACKGROUND

Wireless communications has experienced a rapid development and an increasing number of services are provided by many different operators. Users expect high quality and uninterrupted provision of the services even cross borders, which entails change of operator providing the services. In such so called roaming scenarios, it may be difficult for an operator of a network to estimate the number of roaming users roaming into a network and leaving a network and hence how to make best use of communication resources.

With an increasing number of operators, the market of providing wireless services is becoming competitive and tough. It is in the best interest of all the operators to find ways of improving their services and increasing user satisfaction.

SUMMARY

An objective of the present teachings is to address and improve various aspects in wireless communications systems. A particular objective is to provide improvement in view of resource usage in such systems. Another particular objective is to increase user satisfaction. These objective and others are achieved by the methods, devices, computer programs and computer program products according to the appended independent claims, and by the embodiments according to the dependent claims.

The objective is according to an aspect achieved by a method of enabling improved efficiency in a first communications network based on relation metrics on a relation between a first operator of the first communications network and a second operator of a second communications network. The method is performed in a network entity and comprises: obtaining data relating to users having a subscription with the first operator and data relating to users having a subscription with the second operator; determining, based on the obtained data relating to users, a first metric giving number of users roaming to the first operator from the second operator and a second metric giving number of users roaming from the first operator to the second operator; and providing the first and second metrics as relation metrics to a network device of the first communications network for use in improving efficiency in the first communications network.

The method brings about several advantages. For instance, the method enables a dynamic roaming relation metrics to be provided based on user data. Based on these metrics the operator is able to increase network utilization and thereby obtain increased network efficiency, improved user satisfaction as well as a higher revenue.

The objective is according to an aspect achieved by a computer program for a network entity for providing a metric on a relation between a first and a second communications network. The computer program comprises computer program code, which, when executed on at least one processor on the network entity causes the network entity to perform the method as above.

The objective is according to an aspect achieved by a computer program product comprising a computer program as above and a computer readable means on which the computer program is stored.

The objective is according to an aspect achieved by a network entity for enabling improved efficiency in a first communications network based on relation metrics on a relation between a first operator of the first communications network and a second operator of a second communications network. The network entity is configured to: obtain data relating to users having a subscription with the first operator and data relating to users having a subscription with the second operator; determine, based on the obtained data relating to users, a first metric giving number of users roaming to the first operator from the second operator and a second metric giving number of users roaming from the first operator to the second operator; and provide the first and second metrics as relation metrics to a network device of the first communications network for use in improving efficiency in the first communications network.

The objective is according to an aspect achieved by a method of improving efficiency in a first communications network based on a metric on a relation between a first operator of the first communications network and a second operator of a second communications network. The method is performed in a network device of the first communications network and comprises: providing, to a network entity, data relating to users having a subscription with the first operator; receiving, from the network entity, a first metric giving number of users roaming to the first operator from the second operator and a second metric giving number of users roaming from the first operator to the second operator; and adapting, based on the received first and second metrics, at least one parameter in the first communications network.

The objective is according to an aspect achieved by a computer program for a network device for improving efficiency in a first communications network. The computer program comprises computer program code, which, when executed on at least one processor on the network device causes the network device to perform the method as above.

The objective is according to an aspect achieved by a computer program product comprising a computer program as above and a computer readable means on which the computer program is stored.

The objective is according to an aspect achieved by a network device of a first communications network for improving efficiency in the first communications network based on a metric on a relation between a first operator of the first communications network and a second operator of a second communications network. The network device is configured to: provide, to a network entity, data relating to users having a subscription with the first operator; receive, from the network entity, a first metric giving number of users roaming to the first operator from the second operator and a second metric giving number of users roaming from the first operator to the second operator, and adapt, based on the received first and second metrics, at least one parameter in the first communications network.

Further features and advantages of the embodiments of the present teachings will become clear upon reading the following description and the accompanying drawings.

BRIEF DESCRIPTION OF THE DRAWINGS

FIGS. 5a and 5b are graphs illustrating aspects of the present teachings.

FIG. 6 illustrates graphically a few operator relations as determined according to the present teachings.

DETAILED DESCRIPTION

Figure 1:
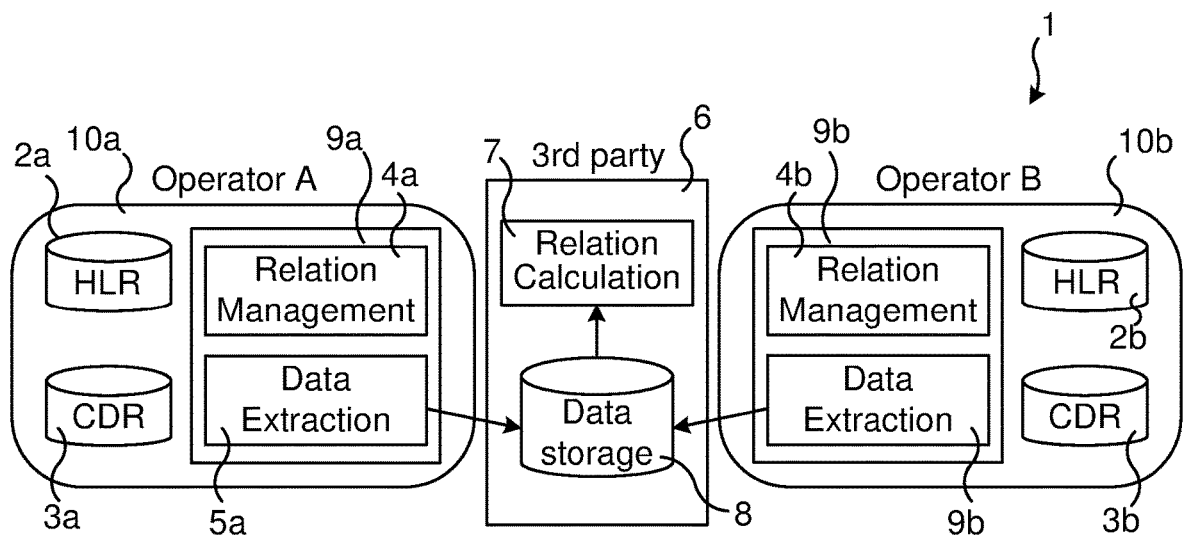
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings provide methods in various embodiments for quantifying operator relations for their roaming users. This enables the operators to provide improved service to their users, while also obtaining highest possible revenue. As mentioned in the background section, many users are roaming among different operators and the operators have different agreements with different operators. Further, the operators may also provide different agreements to their customers. The methods provide the operators one or more metrics, which enables them to improve various aspects, such as for instance improving quality of services for users, availability of services, and optimizing resource use in their communications system, while also increasing their revenue.

A data based approach, described herein, has been developed in order to calculate roaming relation types between each pair of operators. The roaming relation types can, for instance, be used in their mutual relations in order to improve efficiency in their respective communications networks. The roaming relation type may, for instance, account for roaming users not using any services in the visited communications network (such users being denoted silent users herein). Information on such silent users may be used in different ways, as will be described, for improving efficiency e.g. in terms of resource usage, quality and availability of services and economy.

FIG. 1 gives schematically an overview of a system in which embodiments according to the present teachings may be implemented. The system 1 comprises one or more components which are involved in the relation calculation between a pair of operators. Two operators are shown, a first operator A and second operator B, each of which runs a respective communications network 10A, 10B. The communications networks 10A, 10B comprise a number of conventional nodes and devices, for instance, a Home Location Register (HLR) 2A, 2B, Call Detail Record (CDR) 3A, 3B.

The HLR 2A, 2B is a central database that contains details of each subscriber that is authorized to use the communications network 10A, 10B. The HLR 2A, 2B stores, for instance, details of Subscriber Identity Module (SIM) cards issued by the operators, services that the subscriber has requested or been given, current location of subscribers (Visitor Location Register, VLR, may inform the HLR that a subscriber is now residing in a particular area covered by the VLR).

The CDR 3A, 3B is a record of a call or other communication transaction (e.g. text message). The CDR 3A, 3B comprises, for instance, metadata about the call such as subscriber phone number, phone number of the recipient, call duration, call type (voice, Short Message Service (SMS), General Packet Radio Service (GPRS)) etc.

The present teachings suggest the introduction of some additional components. In particular, each communications network 10A, 10B may comprise a Data Extraction entity 5A, 5B, which is responsible for data extraction from both the CDR 3A, 3B and the HLR 2A, 2B database systems. Each communications network 10A, 10B may further comprise a Relation Management entity 4A, 4B.

A third party actor may also be involved, providing a third party system 6. The third party system 6 may comprise a data storage 8, i.e. run by the third party actor, which data storage 8 receives updated data from the Data Extractions entities 5A, 5B of the communications networks 10A, 10B. The third party system 6 may also comprise a Relation Calculations entity 7, by means of which the third party actor may provide an operator relations calculation service to the first and second operators A, B.

The operator relations service may be derived and provided by the third party. The third party may e.g. be a Clearinghouse which may provide this additional service besides conventional services, such as e.g. billing service, number portability service and other services currently provided by such Clearinghouse. The third party system 6 may be responsible for receiving collections of data on a regular basis from both of the first and second operators A, B, for storing these collections and then use them to calculate the mutual relation of the operators on a regular basis. Consequently, the third party system 6 comprises at least two components: a Data Storage 8 that is kept updated and a relation calculations function 7. The relation calculations function 7 is described in more detail later.

Besides the conventional CDR 3A, 3B data provided by each operator, additional data are needed from the HLR 2A, 2B. This extraction of data may be performed by the Data Extraction entity 5A, 5B in each operator's communications network 10A, 10B.

The data extraction entity 5A, 5B is responsible for providing the third party component information about user call records and billable quantities as well as information about silent users. The expression "silent user" is introduced and used herein and means a user who has registered in an operator's communications network, but does not use any service. Today, when a user roams into a new operator's communications network the operator registers this in a network attachment registration procedure, but does not store any information relating to this. According to the present teachings, upon noticing that a roaming user enters the communications network, currently registered user locations may be stored in the HLR 2A, 2B. By storing information on registered users, silent users can be found.

Figure 2:
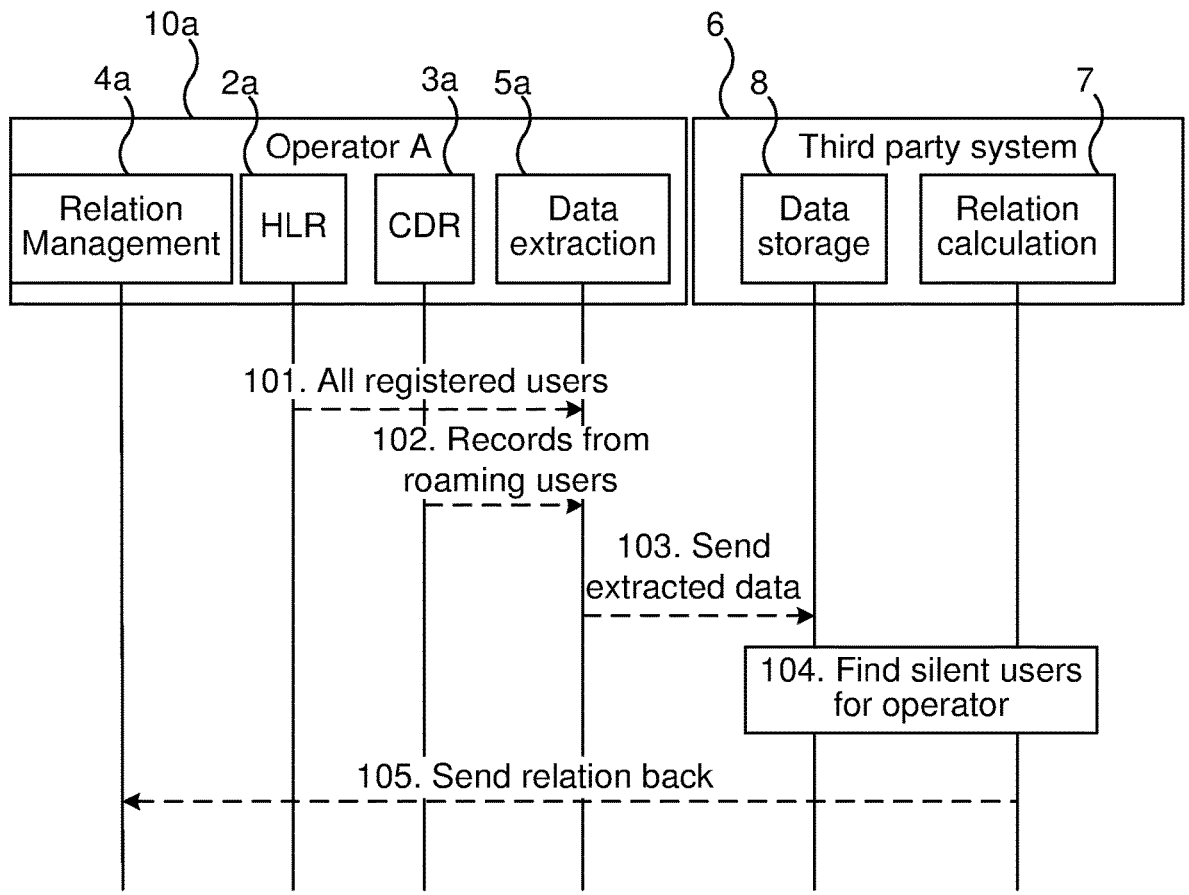
FIG. 2 is a sequence diagram illustrating a process according to an embodiment of the present teachings.

FIG. 2 illustrates a communication process and the system flow between the entities 7, 8 of the third party and the entities of the first operator A. It is noted that other operators, e.g. the second operator B, may have corresponding processes to the third party system 6. The relation calculated in this process is the relation between the first operator A and the second operator B.

At arrow 101, the HLR 10A of the communications network 10A run by the first operator A provides information on all subscribers (of the first operator) to the Data Extraction component 5A.

At arrow 102, the CDR 3A provides the data concerning billable items produced by users roaming in the communications network 10A of the first operator A and originating from the second operator B (i.e. the users having their subscriptions with the second operator B).

Next, at arrow 103, the data extraction entity 5A communicates with the third party system 6, and in particular with the data storage 8 thereof. More specifically, the data extraction entity 5A sends the extracted data to the data storage 8 of the third party system 6.

At box 104, the third party system 6 stores the received data in the data storage 8, e.g. main memory thereof and fetches the corresponding data from the second operator B. The Relation Calculation entity 7 establishes the silent users for both operators and also the relations between operator A and B.

At arrow 105, the third party system 6, e.g. the Relation Calculation entity 7 thereof, sends the result back to operator A and B (only Operator A shown). Each operator may then use the result for optimizing network resource usage, optimize network capacity, adjust their charging plans etc. Examples on how to establish the relations between the first and second operators A, B are given later.

The data collected from each operator comprises CDR data containing information about the number of phone calls, SMS, amount of data traffic for all inbound users. Besides the CDR data, the data extraction entity 5A, 5B extracts also information available in the HLR 2A, 2B about all registered users. This information is, according to some embodiments, used to derive silent users. As mentioned earlier, a silent user is a user who has registered in a communications network, but does not use any service therein.

A first example on how to calculate a relation between the first operator A and the second operator B is given next. The relation calculation may be based on using the following equations:

$$I_{ij} = \frac{\alpha Rin_i}{(\alpha Rin_i + S_{ij})} \left( \frac{R_{ij}}{Rin_i} + c_{ij} \right) \quad (1)$$

$$O_{ij} = \frac{\beta Rout_i}{(\beta Rout_i + S_{ij})} \left( \frac{R_{ij}}{Rout_i} + c_{ij} \right) \quad (2)$$

$$Rel_{ij} = [\, I_{ij} \quad O_{ij} \,] \quad (3)$$

In the above equations:

$I_{ij}$ the inbound relation from operator j to operator i (how many users of operator j roams into the network of operator j), $O_{ij}$ is the outbound relation from operator j to operator i (how many users of operator j is roaming into the network of operator i), $R_{in}$ is the number of non-silent (i.e. active in the sense that they use at least one service) inbound users, $R_{out}$ is the number of non-silent outbound users, $S_i$ is the number of silent users in operator i from operator j, $R_{ij}$ the number of roaming users from operator j to operator I, $\alpha$, $\beta$, and $c_{ij}$ are the system constants (described below).

The relation from operator j to operator i is the combination of inbound relation and outbound. The relation does need not to be symmetric, and is typically not.

The reasoning of the equations is given in the following:

1. Ratio of silent users and total roaming users: the operator may like to reduce the number of silent users, e.g. in order to increase communication resource use, to reduce roaming costs, or in order to encourage them to use services provided by the operator and hence increase the revenue.

2. Cost of handling roaming users: there are extra risk and cost to handle roaming users versus the operator's own users. For instance, data needs to be dynamically updated for the roaming users, and the operator has no way of knowing beforehand how much communications resources the roaming user will require. The own subscribers of an operator are typically more predictable and static. Further, the handling of roaming users may entail higher risks and costs compared to the own subscribers, e.g. in view of payment of services. This extra risk and cost is reflected by the parameters $\alpha$ and $\beta$.

3. The percentage of roaming users from one specific operator versus total number of roaming users.

In the basic relation calculation, only number of users is considered. The relation can be further weighted by the services each user has used. For calculating such weighted relations the $R_{in}$ and $R_{out}$ in the above equations (1) and (2) are replaced by $S_{in}$ and $S_{out}$ below.

$$S_{in} = \Sigma_{i=1}^{M} w_i R_{in}^i \quad (4)$$

$$S_{out} = \Sigma_{i=1}^{N} w_i R_{out}^i \quad (5)$$

where M and N are number of available inbound and outbound services and $w_i$ is the weight for each service. A more expensive or resource requiring service may, for instance, be given a higher weight $w_i$.

Next, a few use case examples are given with reference to FIGS. 3, 4, 5*a* and 5*b*.

Figure 3:
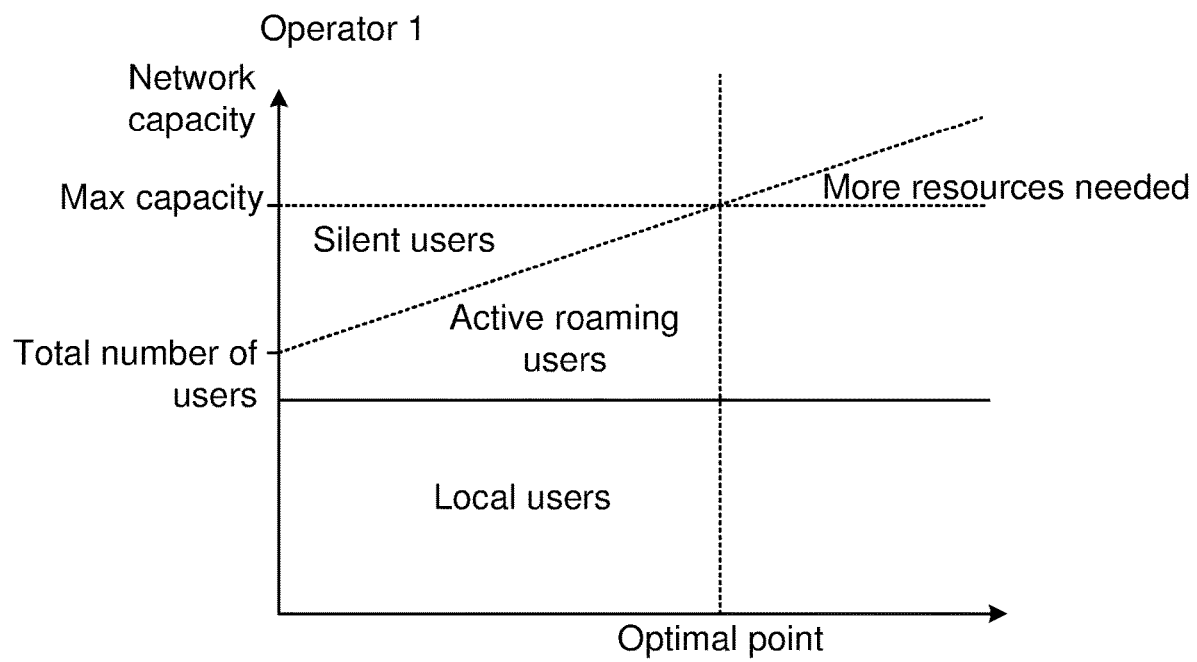
FIG. 3 is a graph illustrating one aspect of the present teachings.

FIG. 3 illustrates a first use case, in which the capacity utilization is to be maximized. In this use case the first operator A wants to maximize the network resource efficiency by activating silent users, assuming that the operator's network capacity and the number of home users are stable. FIG. 3 shows an optimal point (vertical dotted line)

where the first operator A achieves the maximum network utilization, while the number of silent users is at minimum. By the system and methods suggested herein, the first operator A is given knowledge of the silent inbound users of each foreign operator (e.g. the second operator B) by also exchanging information for their own outbound users.

In the process of trying to minimize silent users, the first operator A is also aware of the proportion of the silent users from each foreign operator. This information can be used in order to find "room for improvement".

Figure 4:
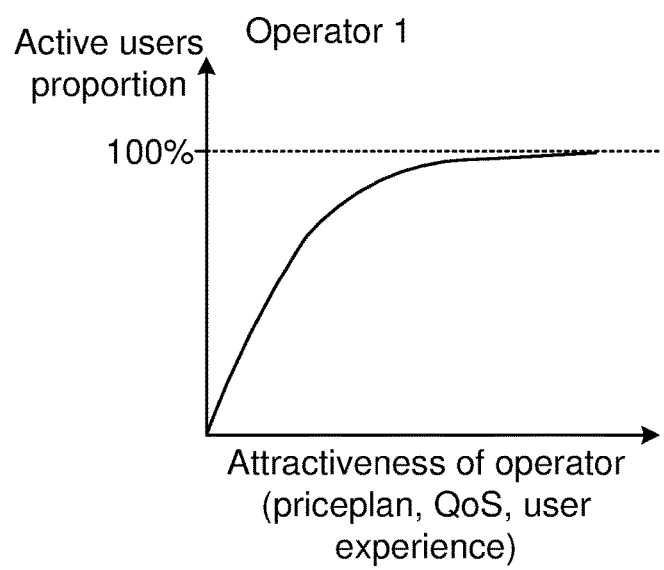
FIG. 4 is a graph illustrating an aspect of the present teachings.

FIG. 4 shows the enabled active users by the attractiveness of the operator, depending on, for instance, one or more of: price plan of the operator, quality of service provide or user experience parameters. As can be seen, the relation between the increase of attractiveness of an operator (e.g. improvement of quality of service) and the number of users it attracts is non-linear. Thus, room for improvement exists in foreign operators where the proportion of silent users against the active users is larger.

As an additional step, the increase of utilization of the network capacity will affect the network relation between a pair of operators. This potential relation improvement can be calculated by the equations provided earlier, in particular, equations (1), (2) and (3).

FIGS. 5a and 5b illustrate a second use case, in which the roaming fee is to be optimized. Assuming the total number of users travelling from, for instance, one country to another cannot be controlled and the profit for each outbound user is constant for each operator, when focusing in one pair of operators (a first operator A and a second operator B) the roaming revenue for each operator is respectively:

$$R_1 = a_1 I_{12} P_1 + a_2 O_{12} c_1 \quad (6)$$

$$R_2 = a_3 I_{21} P_2 + a_4 O_{21} c_2 \quad (7)$$

where:
$I_{12}$, $I_{21}$, $O_{12}$ and $O_{21}$ are the Inbound and Outbound relations as defined earlier,
$P_1$ and $P_2$ are the price plans for the inbound users for each operator
$c_1$ and $c_2$ are the constant charging outbound fees for each operator
$a_{(1:4)}$ are operator defined constants One common goal for all the operators is to reduce the number of silent users and increase the number of users who will use their service for both inbound and outbound roamers, that is mutually decrease the roaming charges up to the point where maximum profit for both operators is achieved. In fact, a mutual agreement on price plans between a pair of operators can drive towards this goal.

FIGS. 5a and 5b show an example of such an optimization. It is assumed that the price plan range is normalized and same for all operators. The maximum profit of the first operator A is reached when equation (6) is maximized. However, since the outbound ratio (O12) depends on the price plan of the second operator B, the optimal price plan should be agreed on between both sides. For the first operator A (and the second operator B respectively) the revenue is maximized when the gradient of the curve is equal by absolute size to the slope of the line, that is, when:

$$a_1 \frac{dI_{12} P_1}{dp} + a_2 \frac{dO_{12}}{dp} c_1 = 0 \quad (8)$$

Figure 12:
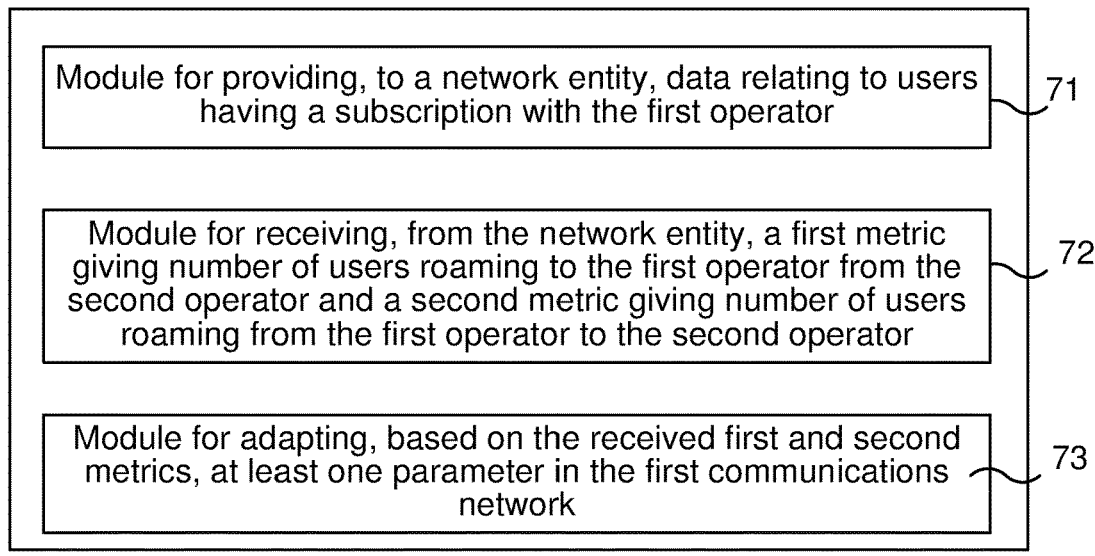
FIG. 12 illustrates a network device comprising function modules/software modules for implementing embodiments of the present teachings.

In a more generalized solution, based on the dataset from which the relation graph in FIG. 12 is derived, one can use a regression algorithm to derive the relation between the price plan and the profit, since it is complicated to express this relation with an analytics model. More specifically, each line of the graph in FIG. 6 corresponds to a price plan and a revenue value. It is possible to fit these into the curves depicted in FIGS. 5a and 5b.

FIG. 6 illustrates graphically a few operator relations as determined according to the present teachings. More specifically, FIG. 6 depicts the result of relation calculation among a group of operators. The thickness of the lines between a pair of nodes (which represent the operators) is an indicator of relationship strength. As mentioned in the background section the number of operators of communications networks are increasing and the method enables, as described herein, an operator to increase network efficiency, e.g. by reducing number of silent users. Each operator Operator 1, Operator 2, . . . , Operator i+n may have multiple relations, in particular any number of relations to different operators. A first operator, Operator 1, may, as illustrated, have a relation to a second operator, Operator 2, and to a third operator, Operator 3. The first operator may have a higher number of inbound users (indicted by the thick line 100) to the second operator, than number of outbound users (indicated by a thinner line 110). Based on the relation metrics the first operator may, for instance, plan resource use, adapt quality of services for users, adapt availability of types of services and increase revenue by adapting charging plans.

In a third use case, the Quality of Service is optimized. The above equation (8) can also be used in quality of service optimization instead of fee optimization. For example, when the pairwise relation is unbalanced, operators can allocate more bandwidth or increase the number of available services for inbound users so as to encourage silent users to use their services or customize special services to the roaming users. Again, a mutual agreement based on the pairwise relation between two operators can achieve best user experience when applying the optimal quality of service.

Figure 7:
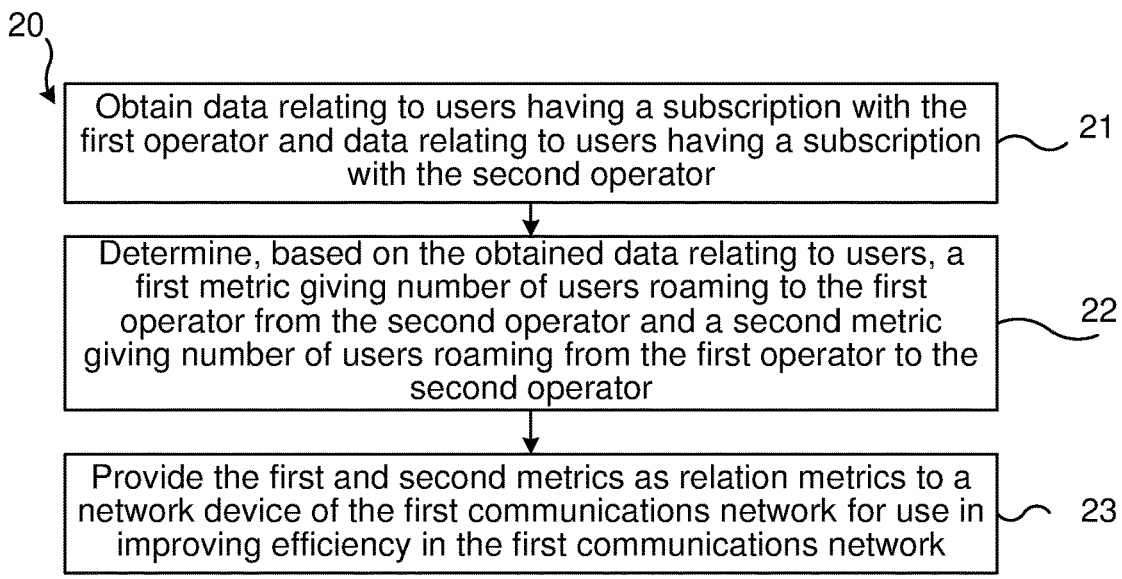
FIG. 7 illustrates a flow chart over steps of an embodiment of a method in a network entity in accordance with the present teachings.

FIG. 7 illustrates a flow chart over steps of an embodiment of a method in a network entity in accordance with the present teachings.

A method 20 of enabling improved efficiency in a first communications network 10A based on relation metrics on a relation between a first operator A of the first communications network 10A and a second operator B of a second communications network 10A, 10B is provided. The method 20 is performed in a network entity 7 (e.g. as described in relation to FIG. 1).

The method 20 comprises obtaining 21 data relating to users having a subscription with the first operator A and data relating to users having a subscription with the second operator B.

The method 20 comprises determining 22, based on the obtained data relating to users, a first metric $I_{AB}$ giving number of users roaming to the first operator A from the second operator B and a second metric $O_{AB}$ giving number of users roaming from the first operator A to the second operator B.

The method 20 comprises providing 23 the first and second metrics $I_{AB}$, $O_{AB}$ as relation metrics to a network device 9A of the first communications network 10A for use in improving efficiency in the first communications network 10A.

In an embodiment, the first and second metrics $I_{AB}$, $O_{AB}$, are determined by using equations:

$$I_{AB} = \frac{\alpha Rin_A}{(\alpha Rin_A + S_{AB})} \left( \frac{R_{AB}}{Rin_A} + c_{AB} \right)$$

$$O_{ij} = \frac{\beta Rout_A}{(\beta Rout_A + S_{BA})} \left( \frac{R_{BA}}{Rout_A} + c_{AB} \right),$$

wherein:

$I_{AB}$ is the number of users roaming to the first operator (A) from the second operator B.

$O_{AB}$ is the number of users roaming from the first operator (A) to the second operator (B).

A user having a subscription with the first operator A has the first communications network 10A (operated by the first operator A) as its home network.

$R_{in}$ is the number of users roaming to the first operator A from the second operator B and using at least one service.

$R_{out}$ is the number of users roaming from the first operator to the second operator and using at least one service.

$S_A$ is the number of silent users roaming to the first operator from the second operator. That is, $S_A$ is the number of silent users roaming to the first operator from the second operator, i.e. the number of silent users roaming into the first communications network 10A from the second communications network 10B.

$R_{AB}$ is the number of users roaming to the first operator from the second operator.

α is a constant relating to cost of handling roaming users.

β is a constant relating to cost of handling users having subscription with the first operator A.

$C_{AB}$ is a constant relating to fees for the first operator A of users roaming to the second operator B.

In some embodiments, the improving efficiency comprises improving one or more of: use of communication resources, quality of services for users, availability of services and revenue for the first operator A. Thus, physical data such as parameters relating to communication resources or parameters relating to quality of service or other user experience parameters, to mention a few examples, may be processed according to the present teachings for determining operator relations.

The various embodiments and features that have been described can be combined in many different ways, further examples of which are given in the following with reference first to FIG. 8.

Figure 8:
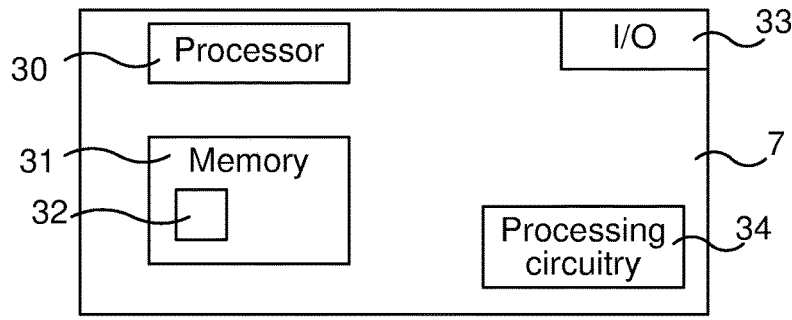
FIG. 8 illustrates schematically a network entity and means for implementing embodiments of the method in accordance with the present teachings.

FIG. 8 illustrates schematically a network entity and means for implementing embodiments of the method in accordance with the present teachings.

The network entity 7 may, for instance, be a server, a virtual server or a virtual machine. The network entity 7 may comprise a processor 30 comprising any combination of one or more of a central processing unit (CPU), multiprocessor, microcontroller, digital signal processor (DSP), application specific integrated circuit etc. capable of executing software instructions stored in a memory 31 which can thus be a computer program product. The processor 30 can be configured to execute any of the various embodiments of the method 20 for instance as described in relation to FIG. 7.

The memory 31 of the network entity 7 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The network entity 7 may comprise an interface 33 for communication with other devices and/or entities. The interface 33 may, for instance, comprise a protocol stack, for communication with other devices or entities. The interface may be used for receiving data input and for outputting data.

The network entity 7 may comprise additional processing circuitry 34 for implementing the various embodiments according to the present teachings.

A network entity 7 is provided for enabling improved efficiency in a first communications network 10A based on relation metrics on a relation between a first operator a of the first communications network 10A and a second operator B of a second communications network 10A, 10B. The network entity 7 is configured to:

obtain data relating to users having a subscription with the first operator A and data relating to users having a subscription with the second operator B, determine, based on the obtained data, a first metric $I_{AB}$ giving number of users roaming to the first operator A from the second operator B and a second metric $O_{AB}$ giving number of users roaming from the first operator A to the second operator B, and provide the first and second metrics $I_{AB}$, $O_{AB}$ as relation metrics to a network device 9A of the first communications network 10A for use in improving efficiency in the first communications network 10A.

The network entity 7 may be configured to perform the above steps e.g. by comprising one or more processors 30 and memory 31, the memory 31 containing instructions executable by the processor 30, whereby the network entity 7 is operative to perform the steps. In an embodiment thus, a network entity is provided for enabling improved efficiency in a first communications network. The network entity comprises one or more processors and memory, the memory containing instructions executable by the processor, whereby the network entity is operative to: obtain data relating to users having a subscription with the first operator and data relating to users having a subscription with the second operator, determine, based on the obtained data, a first metric $I_{AB}$ giving number of users roaming to the first operator from the second operator and a second metric $O_{AB}$ giving number of users roaming from the first operator to the second operator, and provide the first and second metrics $I_{AB}$, $O_{AB}$ as relation metrics to a network device of the first communications network for use in improving efficiency in the first communications network.

In an embodiment, the network entity 7 is configured to determining the first and second metrics $I_{AB}$, $O_{AB}$, by using equations:

$$I_{AB} = \frac{\alpha Rin_A}{(\alpha Rin_A + S_{AB})} \left( \frac{R_{AB}}{Rin_A} + c_{AB} \right)$$

$$O_{ij} = \frac{\beta Rout_A}{(\beta Rout_A + S_{BA})} \left( \frac{R_{BA}}{Rout_A} + c_{AB} \right)$$

In the above equations:

$I_{AB}$ is the number of users roaming to the first operator A from the second operator B.

$O_{AB}$ is the number of users roaming from the first operator A to the second operator B.

$R_{in}$ is the number of users roaming to the first operator A from the second operator B and using at least one service, $R_{out}$ is the number of users roaming from the first operator to the second operator and using at least one service.

$S_A$ is the number of silent users roaming to the first operator from the second operator.

$R_{AB}$ is the number of users roaming to the first operator from the second operator.

α is a constant relating to cost of handling roaming users.

β is a constant relating to cost of handling users having subscription with the first operator A.

$C_{AB}$ is a constant relating to fees for the first operator A of users roaming to the second operator B.

In an embodiment, the network entity 7 is configured to improve efficiency by improving one or more of: use of communication resources, quality of services for users, availability of services and revenue for the first operator A.

The present teachings also encompass a computer program 32 for a network entity 7 for enabling improved efficiency in a first communications network. The computer program 32 comprises computer program code, which, when executed on at least one processor on the network entity 7, causes the network entity 7 to perform the method 20 according to any of the described embodiments.

The present teachings also encompass computer program products 31 for a network entity for enabling improved efficiency in a first communications network. The computer program product 31 comprises the computer program 32 for implementing the embodiments of the methods as described, and a computer readable means on which the computer program 32 is stored. The computer program product, or the memory, thus comprises instructions executable by the processor 30. Such instructions may be comprised in a computer program, or in one or more software modules or function modules. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 9:
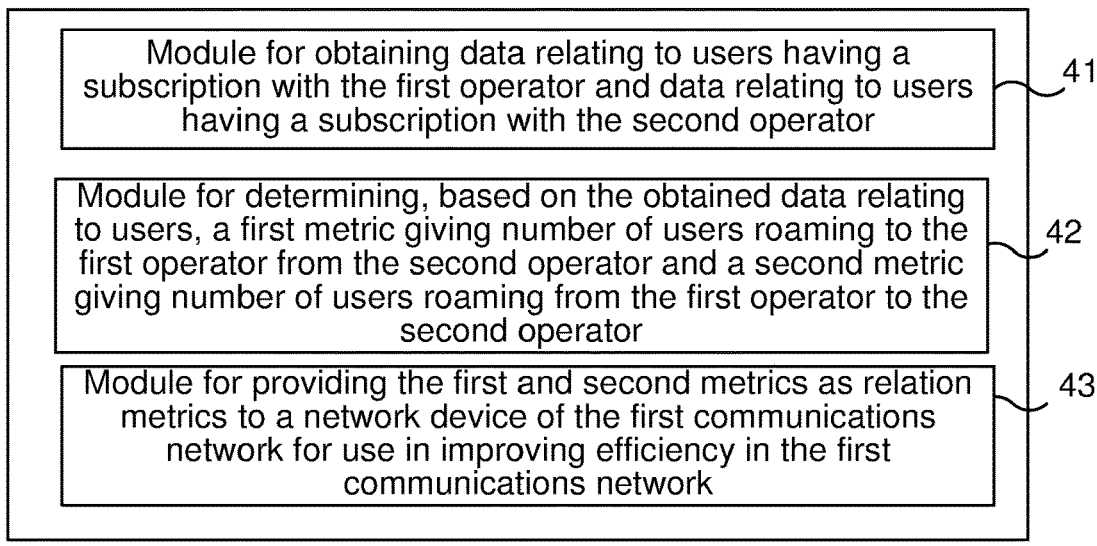
FIG. 9 illustrates a network entity comprising function modules/software modules for implementing embodiments of the present teachings.

FIG. 9 illustrates a network entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A network entity is provided for enabling improved efficiency in a first communications network based on relation metrics on a relation between a first operator of the first communications network and a second operator of a second communications network. The network entity comprises first module 41 for obtaining data relating to users having a subscription with the first operator and data relating to users having a subscription with the second operator. Such first module 41 may, for instance, comprise receiving circuitry for receiving the obtained data relating to users, and/or processing circuitry adapted to obtain such data, e.g. by a request operation.

The network entity comprises second module 42 for determining, based on the obtained data, a first metric $I_{AB}$ giving number of users roaming to the first operator from the second operator and a second metric $O_{AB}$ giving number of users roaming from the first operator to the second operator. Such second module 42 may, for instance, comprise processing circuitry adapted to determine such first and second metrics.

The network entity comprises third module 43 for providing the first and second metrics $I_{AB}$, $O_{AB}$ as relation metrics to a network device of the first communications network for use in improving efficiency in the first communications network. Such third module 43 may, for instance, comprise transmitting circuitry for transmitting such first and second metrics.

It is noted that one or more of the modules 41, 42, 43 may be replaced by units.

Figure 10:
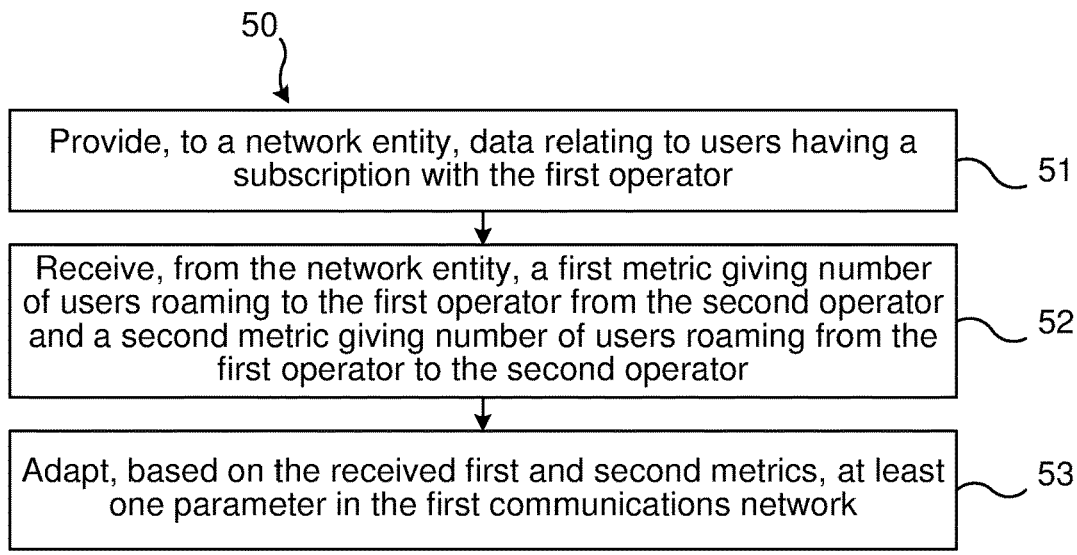
FIG. 10 illustrates a flow chart over steps of an embodiment of a method in a network device in accordance with the present teachings.

FIG. 10 illustrates a flow chart over steps of an embodiment of a method in a network device in accordance with the present teachings. The method 50 is provided of improving efficiency in a first communications network 10A based on a metric on a relation between a first operator A of the first communications network 10A and a second operator B of a second communications network 10A, 10B. The method 50 is performed in a network device 9A of the first communications network 10A.

The method 50 comprises providing 51, to a network entity 7, data relating to users having a subscription with the first operator A.

The method 50 comprises receiving 52, from the network entity 7, a first metric $I_{AB}$ giving number of users roaming to the first operator A from the second operator B and a second metric $O_{AB}$ giving number of users roaming from the first operator A to the second operator B.

The method 50 comprises adapting 53, based on the received first and second metrics $I_{AB}$, $O_{AB}$, at least one parameter in the first communications network 10A. By adapting 53 one or more of the parameter the efficiency in the first communications network 10A can be improved in view of, for instance, resource utilization, user experience, quality of services, and/or obtained revenue.

In an embodiment, the at least one parameter is one or more of: cost of a service, number of communication resources, quality of services for users, availability of services, number of services, number of roaming users using a service in the first communications network 10A and number of silent users in the first communications network 10A.

In various embodiments, the method 50 comprises receiving, from the network entity 7, a set of relation metrics $I_{Aj}$, $O_{Aj}$ for each operator j with which the first operator A has a roaming agreement.

In various embodiments, the method 50 comprises minimizing number of silent users roaming to the first operator A from one or more operators j with which the first operator A has a roaming agreement, by adapting 53 one or more of: cost of a service, cost of roaming and available communication resources.

In various embodiments, the method 50 comprises determining the number of silent users roaming in the first communications network 10A based at least on the received first and second metrics $I_{AB}$, $O_{AB}$, and wherein the adapting 53 comprises adapting one or both of the number of services provided in the first communications network 10A and the number of silent users in the first communications network 10A such as to balance at least the first metric $I_{AB}$ and the second metric $O_{AB}$.

In various embodiments, the adapting 53 comprises adapting number of communication resources in the first communications network 10A such as to balance the first metric $I_{AB}$ and the second metric $O_{AB}$.

Figure 11:
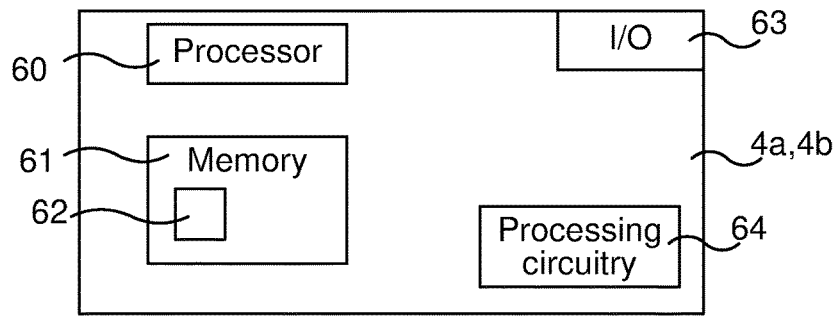
FIG. 11 illustrates schematically a network device and means for implementing embodiments of the method in accordance with the present teachings.

FIG. 11 illustrates schematically a network device and means for implementing embodiments of the method in accordance with the present teachings.

The network device 9A may, for instance, be a server, a virtual server or a virtual machine. The network device 9A may comprise a processor 60 comprising any combination of one or more of a central processing unit (CPU), multi-processor, microcontroller, digital signal processor (DSP), application specific integrated circuit etc. capable of executing software instructions stored in a memory 61 which can thus be a computer program product. The processor 60 can be configured to execute any of the various embodiments of the method 50 for instance as described in relation to FIG. 10.

The memory 61 of the network device 9A can be any combination of read and write memory (RAM) and read only memory (ROM), Flash memory, magnetic tape, Compact Disc (CD)-ROM, digital versatile disc (DVD), Blu-ray disc etc. The memory 61 may also comprise persistent storage, which, for example, can be any single one or combination of magnetic memory, optical memory, solid state memory or even remotely mounted memory.

The network device 9A may comprise an interface 63 for communication with other devices and/or entities. The interface 63 may, for instance, comprise a protocol stack, for communication with other devices or entities. The interface may be used for receiving data input and for outputting data.

The network device 9A may comprise additional processing circuitry 64 for implementing the various embodiments according to the present teachings.

A network device 9A of a first communications network 10A is provided for improving efficiency in the first communications network 10A based on a metric on a relation between a first operator A of the first communications network 10A and a second operator B of a second communications network 10A, 10B. The network device 9A is configured to:

provide, to a network entity 7, data relating to users having a subscription with the first operator A, receive, from the network entity 7, a first metric $I_{AB}$ giving number of users roaming to the first operator A from the second operator B and a second metric $O_{AB}$ giving number of users roaming from the first operator A to the second operator B, and adapt, based on the received first and second metrics $I_{AB}$, $O_{AB}$, at least one parameter in the first communications network 10A.

The network device 9A may be configured to perform the above steps e.g. by comprising one or more processors 60 and memory 61, the memory 61 containing instructions executable by the processor 60, whereby the network device 9A is operative to perform the steps. In an embodiment thus, a network device is provided for improving efficiency in a first communications network. The network device comprises one or more processors and memory, the memory containing instructions executable by the processor, whereby the network entity is operative to: provide, to a network entity, data relating to users having a subscription with the first operator; receive, from the network entity, a first metric $I_{AB}$ giving number of users roaming to the first operator from the second operator and a second metric $O_{AB}$ giving number of users roaming from the first operator to the second operator; and adapt, based on the received first and second metrics $I_{AB}$, $O_{AB}$, at least one parameter in the first communications network.

In an embodiment, the at least one parameter is one or more of: cost of a service, number of communication resources, quality of services for users, availability of services, number of services, number of roaming users using a service in the first communications network 10A and number of silent users in the first communications network 10A.

In various embodiments, the network device 9A is configured to receive, from the network entity 7, a set of relation metrics $I_{Aj}$, $O_{Aj}$ for each operator j with which the first operator A has a roaming agreement.

In various embodiments, the network device 9A is configured to minimize number of silent users roaming to the first operator A from one or more operators j with which the first operator A has a roaming agreement, by adapting 53 one or more of cost of a service, cost of roaming and available communication resources.

In various embodiments, the network device 9A is configured to determine the number of silent users roaming in the first communications network 10A based at least on the received first and second metrics $I_{AB}$, $O_{AB}$, and wherein the adapting 53 comprises adapting one or both of the number of services provided in the first communications network 10A and the number of silent users in the first communications network 10A such as to balance at least the first metric $I_{AB}$ and the second metric $O_{AB}$.

In various embodiments, the network device 9A is configured to adapt by adapting number of communication resources in the first communications network 10A such as to balance the first metric $I_{AB}$ and the second metric $O_{AB}$.

The present teachings also encompass a computer program 62 for a network device 9A for improving efficiency in a first communications network. The computer program 62 comprises computer program code, which, when executed on at least one processor on the network device 9A, causes the network device 9A to perform the method 50 according to any of the described embodiments.

The present teachings also encompass computer program products 61 for a network device for improving efficiency in a first communications network. The computer program product 61 comprises the computer program 62 for implementing the embodiments of the methods as described, and a computer readable means on which the computer program 62 is stored. The computer program product, or the memory, thus comprises instructions executable by the processor 60. Such instructions may be comprised in a computer program, or in one or more software modules or function modules. The computer program product 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

FIG. 12 illustrates a network device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

The network device comprises a first module 71 for providing, to a network entity, data relating to users having a subscription with the first operator A. Such first module 71 may, for instance, comprise transmitting circuitry for transmitting such first and second metrics, thereby providing the data relating to users.

The network device comprises a second module 72 for receiving, from the network entity, a first metric $I_{AB}$ giving number of users roaming to the first operator A from the second operator B and a second metric $O_{AB}$ giving number of users roaming from the first operator A to the second operator B. Such second module 72 may, for instance, comprise receiving circuitry and/or processing circuitry adapted for receiving such metrics.

The network device comprises a third module 73 for adapting, based on the received first and second metrics $I_{AB}$, $O_{AB}$, at least one parameter in the first communications network. Such third module 73 may, for instance, comprise processing circuitry adapted for performing such adaptation of the at least one parameter.

It is noted that one or more of the modules 71, 72, 73 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of enabling improved efficiency in a first communications network based on relation metrics on a relation between a first operator (A) of the first communications network and a second operator (B) of a second communications network, the method comprising a network entity:
    obtaining data relating to users having a subscription with the first operator and data relating to users having a subscription with the second operator;
    determining, based on the obtained data relating to users:
        a first metric ($I_{AB}$) giving number of users roaming to the first operator from the second operator; and
        a second metric ($O_{AB}$) giving number of users roaming from the first operator to the second operator; and
    providing the first and second metrics as relation metrics to a network device of the first communications network for use in improving efficiency in the first communications network.

2. The method of claim 1, wherein the first and second metrics are determined by using equations:

$$I_{AB} = \frac{\alpha Rin_A}{(\alpha Rin_A + S_{AB})}\left(\frac{R_{AB}}{Rin_A} + c_{AB}\right)$$

$$O_{ij} = \frac{\beta Rout_A}{(\beta Rout_A + S_{BA})}\left(\frac{R_{BA}}{Rout_A} + c_{AB}\right)$$

wherein:
$I_{AB}$ is the number of users roaming to the first operator from the second operator;
$O_{AB}$ is the number of users roaming from the first operator to the second operator;
$R_{in}$ is the number of users roaming to the first operator from the second operator and using at least one service;
$R_{out}$ is the number of users roaming from the first operator to the second operator and using at least one service;
$S_A$ is the number of silent users roaming to the first operator from the second operator;
$R_{AB}$ is the number of users roaming to the first operator from the second operator;
$\alpha$ is a constant relating to cost of handling roaming users;
$\beta$ is a constant relating to cost of handling users having subscription with the first operator; and
$C_{AB}$ is a constant relating to fees for the first operator of users roaming to the second operator.

3. The method of claim 1, wherein the improving efficiency comprises improving: use of communication resources, quality of services for users, availability of services, and/or revenue for the first operator.

4. A network entity for enabling improved efficiency in a first communications network based on relation metrics on a relation between a first operator (A) of the first communications network and a second operator (B) of a second communications network, the network entity comprising:
    processing circuitry;
    memory containing instructions executable by the processing circuitry whereby the network entity is operative to:
        obtain data relating to users having a subscription with the first operator and data relating to users having a subscription with the second operator;
        determine, based on the obtained data:
            a first metric ($I_{AB}$) giving number of users roaming to the first operator from the second operator; and
            a second metric ($O_{AB}$) giving number of users roaming from the first operator to the second operator; and
        provide the first and second metrics as relation metrics to a network device of the first communications network for use in improving efficiency in the first communications network.

5. The network entity of claim 4, wherein the instructions are such that the network entity is operative to determine the first and second metrics by using equations:

$$I_{AB} = \frac{\alpha Rin_A}{(\alpha Rin_A + S_{AB})}\left(\frac{R_{AB}}{Rin_A} + c_{AB}\right)$$

$$O_{ij} = \frac{\beta Rout_A}{(\beta Rout_A + S_{BA})}\left(\frac{R_{BA}}{Rout_A} + c_{AB}\right)$$

wherein:
$I_{AB}$ is the number of users roaming to the first operator from the second operator;
$O_{AB}$ is the number of users roaming from the first operator to the second operator;
$R_{in}$ is the number of users roaming to the first operator from the second operator and using at least one service;
$R_{out}$ is the number of users roaming from the first operator to the second operator and using at least one service;
$S_A$ is the number of silent users roaming to the first operator from the second operator;
$R_{AB}$ is the number of users roaming to the first operator from the second operator;
$\alpha$ is a constant relating to cost of handling roaming users;
$\beta$ is a constant relating to cost of handling users having subscription with the first operator; and
$C_{AB}$ is a constant relating to fees for the first operator of users roaming to the second operator.

6. The network entity of claim 4, wherein the instructions are such that the network entity is operative to improve efficiency by improving: use of communication resources, quality of services for users, availability of services, and/or revenue for the first operator.

7. A method of improving efficiency in a first communications network based on a metric on a relation between a first operator (A) of the first communications network and a second operator (B) of a second communications network, the method comprising a network device of the first communications network:
    providing, to a network entity, data relating to users having a subscription with the first operator;
    receiving, from the network entity:
        a first metric ($I_{AB}$) giving number of users roaming to the first operator from the second operator; and
        a second metric ($O_{AB}$) giving number of users roaming from the first operator to the second operator; and adapting, based on the received first and second metrics, at least one parameter in the first communications network.

8. The method of claim 7, wherein the at least one parameter is: cost of a service, number of communication resources, quality of services for users, availability of services, number of services, number of roaming users using a service in the first communications network, and/or number of silent users in the first communications network.

9. The method of claim 7, further comprising receiving, from the network entity, a set of relation metrics $I_{Aj}$, $O_{Aj}$ for each operator j with which the first operator has a roaming agreement.

10. The method of claim 7, further comprising minimizing a number of silent users roaming to the first operator from one or more operators j with which the first operator has a roaming agreement, by adapting: a cost of a service, a cost of roaming, and/or available communication resources.

11. The method of claim 7:
further comprising determining the number of silent users roaming in the first communications network based at least on the received first and second metrics $I_{AB}$, $O_{AB}$; and
wherein the adapting comprises adapting one or both of the number of services provided in the first communications network and the number of silent users in the first communications network, so as to balance at least the first metric $I_{AB}$ and the second metric $O_{AB}$.

12. The method of claim 7, wherein the adapting comprises adapting a number of communication resources in the first communications network so as to balance the first metric $I_{AB}$ and the second metric $O_{AB}$.

13. A network device of a first communications network for improving efficiency in the first communications network based on a metric on a relation between a first operator (A) of the first communications network and a second operator (B) of a second communications network, the network device comprising:
processing circuitry;
memory containing instructions executable by the processing circuitry whereby the network device is operative to:
provide, to a network entity, data relating to users having a subscription with the first operator;
receive, from the network entity:
a first metric ($I_{AB}$) giving number of users roaming to the first operator from the second operator; and
a second metric ($O_{AB}$) giving number of users roaming from the first operator to the second operator; and
adapt, based on the received first and second metrics, at least one parameter in the first communications network.

14. The network device of claim 13, wherein the at least one parameter is: a cost of a service, a number of communication resources, a quality of services for users, an availability of services, a number of services, a number of roaming users using a service in the first communications network, and/or a number of silent users in the first communications network.

15. The network device of claim 13, wherein the instructions are such that the network device is operative to receive, from the network entity, a set of relation metrics $I_{Aj}$, $O_{Aj}$ for each operator j with which the first operator has a roaming agreement.

16. The network device of claim 13, wherein the instructions are such that the network device is operative to minimize a number of silent users roaming to the first operator A from one or more operators j with which the first operator has a roaming agreement, by adapting: a cost of a service, a cost of roaming, and/or available communication resources.

17. The network device of claim 13, wherein the instructions are such that the network device is operative to:
determine the number of silent users roaming in the first communications network based at least on the received first and second metrics $I_{AB}$, $O_{AB}$; and
perform the adapting by adapting one or both of the number of services provided in the first communications network and the number of silent users in the first communications network, so as to balance at least the first metric $I_{AB}$ and the second metric $O_{AB}$.

18. The network device of claim 13, wherein the instructions are such that the network device is operative to perform the adapting by adapting a number of communication resources in the first communications network so as to balance the first metric $I_{AB}$ and the second metric $O_{AB}$.

* * * * *